United States Patent [19]
Tanaka

[11] Patent Number: 5,604,837
[45] Date of Patent: Feb. 18, 1997

[54] LIGHT TRANSMITTING APPARATUS

[75] Inventor: Takao Tanaka, Kyoto, Japan

[73] Assignee: Japan Storage Battery Co., Ltd., Kyoto, Japan

[21] Appl. No.: 395,695

[22] Filed: Feb. 28, 1995

[51] Int. Cl.$^6$ .................................................. G02B 6/00
[52] U.S. Cl. .......................... 385/147; 385/32; 385/31; 385/900
[58] Field of Search .................................. 385/147, 133, 385/900, 901, 32, 31, 23, 50; 362/32

[56]            References Cited

U.S. PATENT DOCUMENTS 4,669,817   6/1987   Mori ............................... 385/147 X
4,747,660   5/1988   Nishioka et al. ................. 385/147 X
5,253,312  10/1993   Payne et al. ........................ 385/31

*Primary Examiner*—Phan T. H. Palmer
*Attorney, Agent, or Firm*—Sughrue, Mion, Zinn, Macpeak & Seas

[57]              ABSTRACT

A light transmitting apparatus of the present invention has cylindrical ducts in which the light transmits, the ducts having an internal light reflection effect and a bending portion having an internal light reflection effect, a cross section of the bending portion is elliptical; wherein the bending portion connects the ducts. Accordingly, the present invention can improve the light transmitting efficiency of the bending part of the apparatus for transmitting the light.

4 Claims, 3 Drawing Sheets

LIGHT TRANSMITTING APPARATUS

BACKGROUND OF THE INVENTION

1. Field of the Invention

A present invention relates to a light transmitting apparatus having a bending part, which is used in transmitting, natural light artificial light or the like.

2. Description of the Conventional Art

A light transmitting device has been known in which the light is transmitted inside cylindrical duct so that the light is reflected in the inside of the duct. In a light transmitting apparatus, a straight and cylindrical duct is used to transmit the light linearly. However, a bending part is necessary to transmit the light to a predetermined place.

For example, the conventional light transmitting apparatus has cylindrical ducts. 1, 1' and a bending part 10 as shown in FIG. 2A. The cross section of the bending part is shown in FIG. 2D. As shown in FIGS. 2B and 2C, the conventional light transmitting has a duct 1, 1'. The bending part 10 includes a flat reflecting mirror 2 inclined at 45° to obtain a regular reflection effect with respect to the light transmission direction, triangular side reflecting mirrors 3 mounted at both sides of the flat reflecting mirror 2 so as to transmit the light in the perpendicular direction, and coupling members 5, 5' which are respectively connected with the ducts 1, 1' so as to connect the bending part 10 with the ducts 1, 1'. Consequently, the light transmitted in the duct 1 can be introduced into the duct 1' which is perpendicular to the duct 1.

However, the shape of a light distribution of an outgoing light which is transmitted in the duct 1 having the reflection effect depends on the shape of a light distribution of a incoming light, but generally, is axially symmetrical along the light transmission direction. Some part of the axially symmetrical light which is reflected by the center portion of the flat reflecting mirror 2 being set at an angle so as to perform a regular reflection is effectively reflected to a desirable direction as a primary reflected light. However, since the number of reflections of the light reflected by the side flat reflecting mirrors 3 is two or more, the light reflected by the side flat reflecting mirrors 3 cannot be reflected effectively. Such a problem has been an obstruction in light transmission.

In addition, for example, the other conventional light transmitting apparatus has the duct 1, 1' and a bending part 6 having a circular cross section as shown in FIGS. 3A and 3B. The transmitting efficiency of this light transmitting apparatus is better than the former conventional light transmitting apparatus. However, this light transmitting device also has a problem in the transmitting efficiency.

SUMMARY OF THE INVENTION

It is an object of the present invention to improve the light transmitting efficiency of the bending part of the duct for transmitting the light.

A light transmitting apparatus of the present invention is comprised of: cylindrical ducts in which the light transmits, the ducts having an internal light reflection effect and an internal bending portion having a light reflection effect, a cross section of the bending portion being elliptical; wherein the bending portion connects the ducts.

Accordingly, the present invention can improve the reflection effect of the bending part of the light transmitting apparatus. In addition, since the end portions of the ducts are connected with the elliptical reflection cylinder and are in contact with each other, the number of regular reflections can be decreased so that the apparatus for transmitting the light has a high reflectance.

BRIEF DESCRIPTION OF THE DRAWINGS

In the accompanying drawings.

DETAILED DESCRIPTION OF THE INVENTION

The detailed description of the light transmitting apparatus of the present invention will be described with reference to FIGS. 1A, 1B, 1C and 1D as follows.

An end portion 7 of a duct 1 contacts at a right angle to an end portion 7' of a duct 1' at substantially one point. A reflection cylinder 4 having an elliptical shape along the line A–A' is a bending part of the light transmitting apparatus having a curved surface and is provided to contact with the peripheries of the respective ducts 1, 1'. The line A–A' is perpendicular to the longitudinal axis of the bending portion. Accordingly, the transmitting direction of the light transmitted in a duct 1 can be changed perpendicularly to be introduced in the duct 1'. The reflection cylinder 4 is comprised of an element having a high reflectance similar to the ducts 1, 1'. The ducts 1, 1' are connected with the reflection cylinder 4 by the mechanical contact welding or the like so that gaps between the ducts 1, 1' and the reflection cylinder 4 are as small as possible.

As the light transmitting apparatus is thus constructed, the greater part of the light transmitted from the duct 1 is reflected by the elliptical reflection cylinder 4 as a primary reflected light so that the reflected light is transmitted to the other duct 1'. Accordingly, the efficiency of the light transmitting at the bending part can be improved.

Figure 1A:
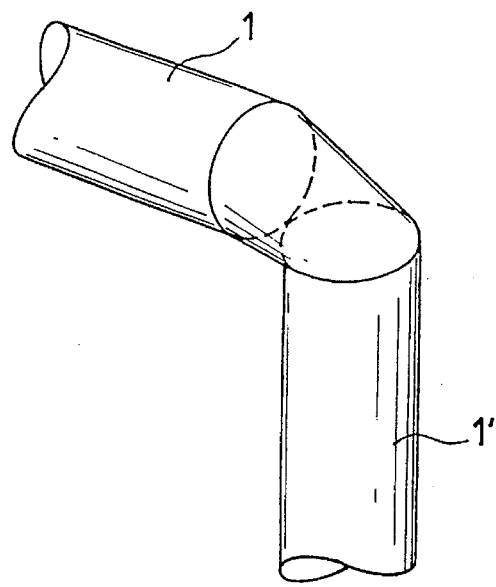
FIG. 1A is a perspective view of a light transmitting apparatus of the present invention.
Figure 1B:
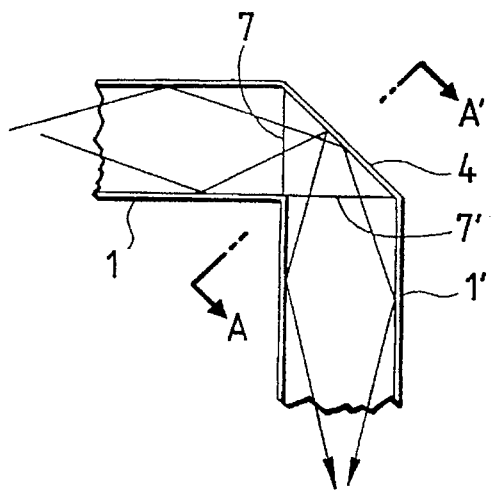
FIG. 1B is a front sectional view of the light transmitting apparatus of the present invention.
Figure 1C:
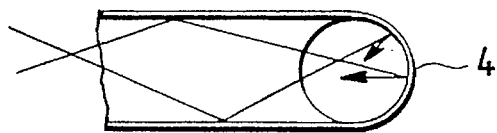
FIG. 1C is a plane sectional view of the light transmitting apparatus of the present invention.
Figure 1D:
FIG. 1D is a sectional view at A–A' line in FIG. 1B.
Figure 2A:
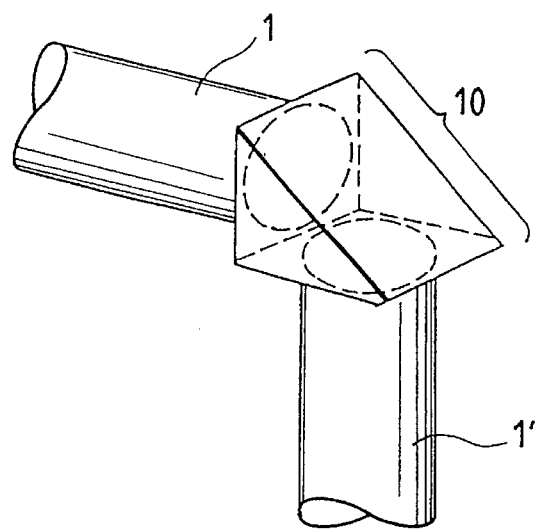
FIG. 2A is a perspective view of a conventional light transmitting apparatus.
Figure 2B:
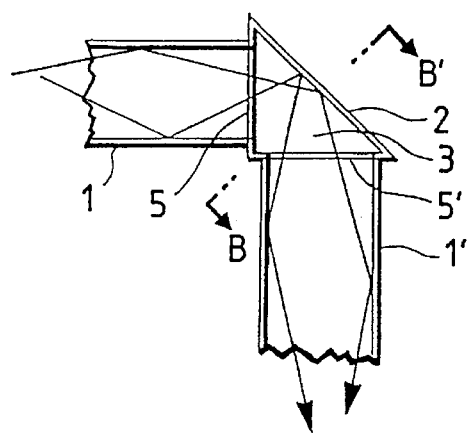
FIG. 2B is a front sectional view of the conventional light transmitting apparatus.
Figure 2C:
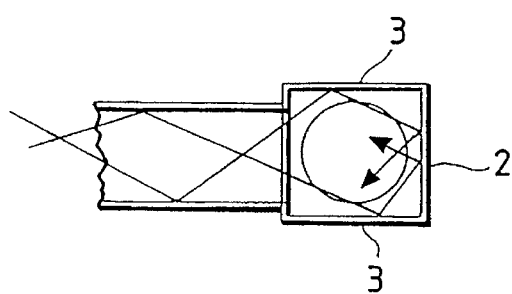
FIG. 2C is a plane sectional view of the conventional light transmitting apparatus.
Figure 2D:
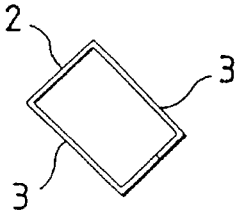
FIG. 2D is a sectional view at B–B' line in FIG. 2B.
Figure 3A:
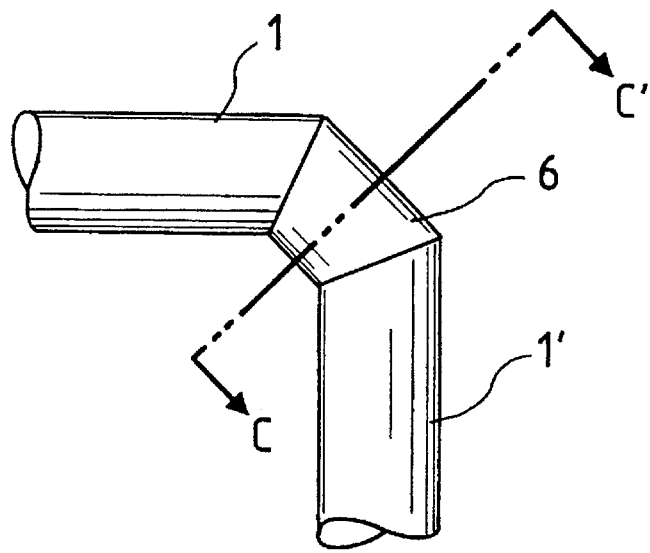
FIG. 3A is a plan view of the other conventional light transmitting apparatus.
Figure 3B:
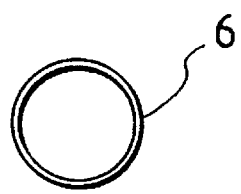
FIG. 3B is a sectional view at C–C' line in FIG. 3A.

A working example of the light transmitting apparatus of the present invention is compared with that of the conventional devices under the same conditions. The transmitting efficiency of the conventional apparatus as shown in FIG. 2A at the bending part is as low as 50% when the light is not transmitted efficiently. Further, the efficiency of the other conventional apparatus as shown in FIG. 3A at the bending part is less than 70%. On the other hand, the efficiency of the apparatus of the present invention is more than 80%.

Therefore, as described above, the present invention can improve the light transmitting efficiency of the bending part of the light transmitting apparatus. The present invention contributes to realize efficient light transmission.

What is claimed is:

1. A light transmitting apparatus comprising:
    a first cylindrical duct for transmitting a light therein in first direction, said duct having an internal light reflection effect;
    a second cylindrical duct for transmitting a light therein in a second direction, said duct having an internal reflection effect; and
    a bending portion, having a longitudinal axis, connected between said first and second ducts for changing a light transmission direction from said first direction to said second direction, said bending portion having an internal reflection effect,
    wherein said bending portion has a shape which is elliptical in cross-section in a plane perpendicular to the longitudinal axis of said bending portion.

2. A light transmitting apparatus as claimed in claim 1, wherein the internal light reflection effect of the said bending portion is the same as that of said ducts.

3. A light transmitting apparatus as claimed in claim 1, wherein an end portion of said first duct is connected at a right angle to an end portion of said second duct at substantially one point.

4. A light transmitting apparatus as claimed in claim 1, wherein there are no gaps between said cylindrical ducts and said bending portion.

* * * * *